United States Patent [19]
Resh

[11] Patent Number: 5,831,793
[45] Date of Patent: Nov. 3, 1998

[54] SUSPENSION ASSEMBLY SHOCK ABSORBER

[75] Inventor: Roger A. Resh, Prior Lake, Minn.

[73] Assignee: Seagate Technology, Inc., Scotts Valley, Calif.

[21] Appl. No.: 698,039

[22] Filed: Aug. 12, 1996

Related U.S. Application Data

[60] Provisional application No. 60/022,932 Jul. 10, 1996.

[51] Int. Cl.$^6$ ........................................... G11B 5/48
[52] U.S. Cl. ............................................... 360/104
[58] Field of Search ..................... 360/103, 104, 360/105, 106, 97.02, 97.03

[56] References Cited

U.S. PATENT DOCUMENTS 4,399,476  8/1983  King ........................................ 360/104
5,408,372  4/1995  Karam, II ............................... 360/104
5,422,770  6/1995  Alt ........................................... 360/105

FOREIGN PATENT DOCUMENTS 58-111153  7/1988  Japan ..................................... 360/104

*Primary Examiner*—Stuart S. Levy
*Assistant Examiner*—David D. Davis
*Attorney, Agent, or Firm*—Westman, Champlin & Kelly

[57] ABSTRACT

A transducer support assembly supports a transducer relative to a disc in a disc drive. The transducer support assembly includes a slider coupled to the transducer and a suspension assembly supporting the slider. The suspension assembly includes a bias member configured such that, upon relative movement of the disc and the suspension assembly toward one another a sufficient distance, the bias member contacts the disc and exerts a bias thereagainst before a remainder of the suspension assembly contacts the disc.

19 Claims, 3 Drawing Sheets

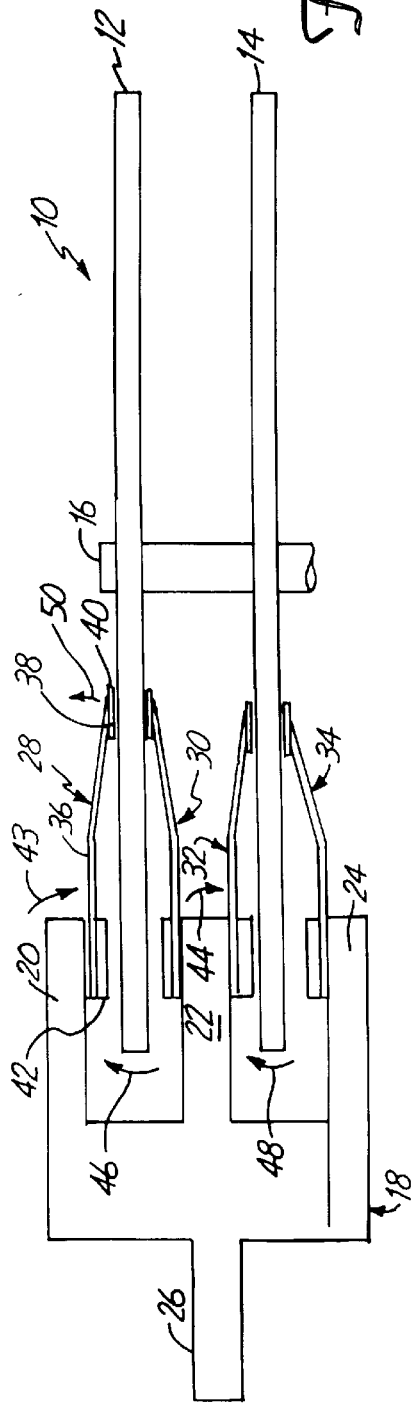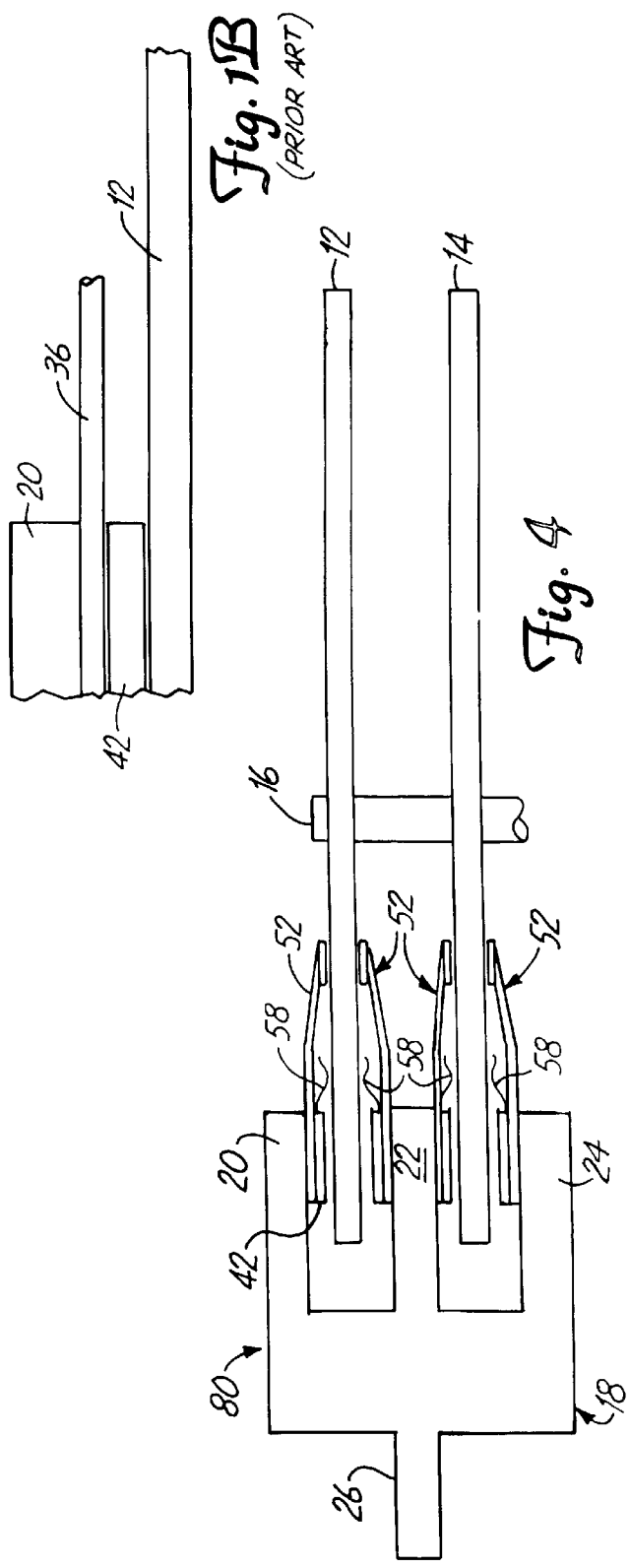

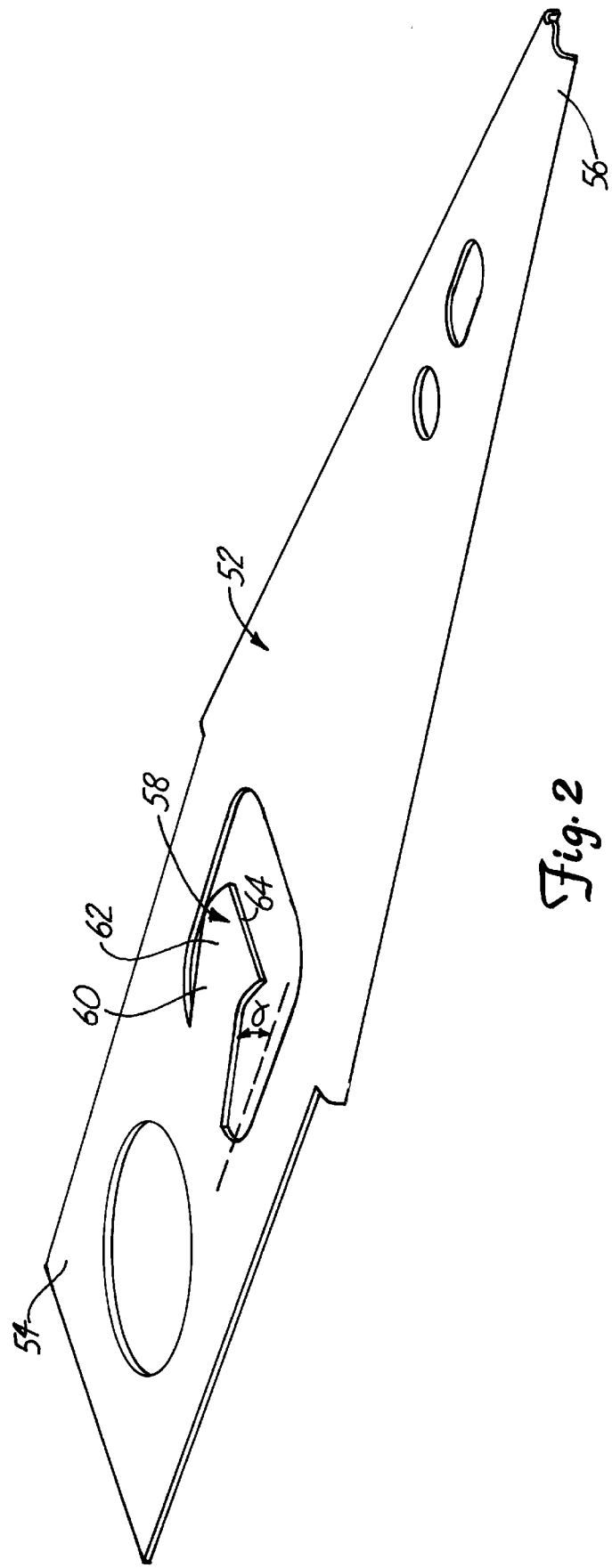

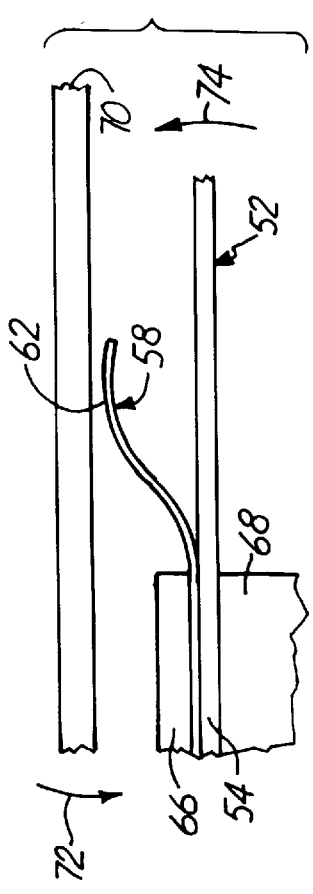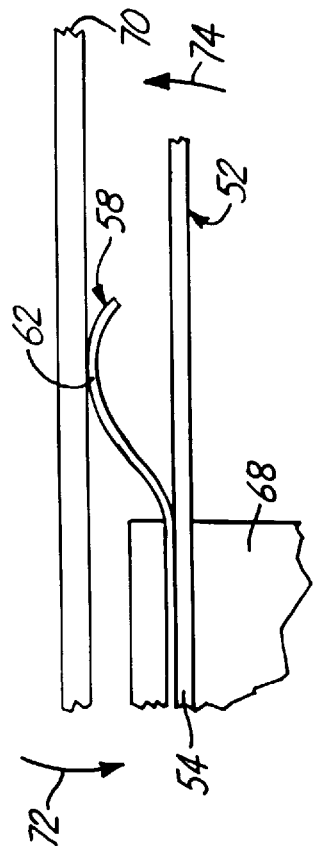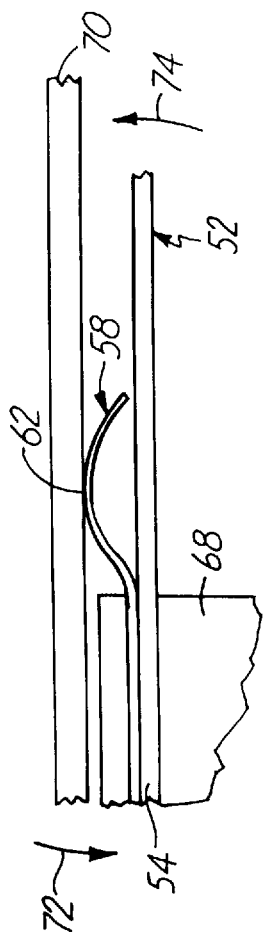

SUSPENSION ASSEMBLY SHOCK ABSORBER

REFERENCE TO RELATED APPLICATION

The present application is based on a provisional application Ser. No. 60/022,932 filed on Jul. 10, 1996.

BACKGROUND OF THE INVENTION

The present invention deals with disc drives. More specifically, the invention deals with a shock absorber in a suspension assembly in a disc drive.

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. The data head is supported by a flexure (or gimbal) which is coupled to the slider. The gimbal is, in turn, coupled to a load beam which is attached to an actuator arm. The gimbal provides resilience in the pitch and roll direction so that the slider can follow the topography of the disc surface over which it is flying. The load beam provides a load bias force which biases the slider toward the disc surface. A portion of the load beam is sandwiched between an actuator arm and a baseplate which is used to assist attachment of the load beam to the actuator arm.

The actuator arm is coupled to an electromechanical actuator which operates within a negative feedback, closed-loop servo system. The actuator moves the data head radially over the disc surface for track seek operations and holds the transducer directly over a track on the disc surface for track following operations.

Information is typically stored in concentric tracks on the surface of the magnetic discs by providing a write signal to the data head to encode flux reversals on the surface of the magnetic disc representing the data to be stored. In retrieving data from the disc, a drive controller controls the electromechanical actuator so that the data head flies above the magnetic disc, sensing the flux reversals on the magnetic disc, and generating a read signal based on those flux reversals. The read signal is typically conditioned and then decoded by the drive controller to recover data represented by the flux reversals stored on the magnetic disc, and consequently represented in the read signal provided by the data head.

In prior drives, when shock forces are imparted on the drives, moments are induced on both the actuator arms and on the discs themselves causing the actuator arms and the discs to deflect and move relative to one another. If the forces are great enough, the actuator arm, or baseplate, come into contact the disc surface. Such contact is highly detrimental to the disc surface and can destroy large portions of the disc surface rendering those portions unfit for operation.

Even with smaller shocks, head slap can be induced in the disc drive. Head slap occurs when the data head comes into violent contact with the disc surface, also destroying portions of the disc surface.

One option to address this problem includes making the actuator arms stiffer by making them thicker. This, of course, would require more room in the axial direction and may result in the loss of a disc or a disc surface in the disc drive, thus sacrificing storage capacity.

SUMMARY OF THE INVENTION

A transducer support assembly supports a transducer relative to a disc in a disc drive. The transducer support assembly includes a slider coupled to the transducer and a suspension assembly supporting the slider. The suspension assembly includes a bias member configured such that, upon relative movement of the disc and the suspension assembly toward one another a sufficient distance, the bias member contacts the disc and exerts a bias thereagainst preventing the remainder of the suspension assembly from contacting the disc, or reducing that contact force.

BRIEF DESCRIPTION OF THE DRAWINGS

FIG. 1A is a side view of a portion of a disc drive according to the prior art.

FIG. 1B is a greatly enlarged portion of the disc drive shown in FIG. 1A.

FIG. 2 is a perspective view of a portion of a load beam according to the present invention.

FIG. 3A illustrates a greatly enlarged portion of a disc drive showing a bias member according to the present invention, in a first position.

FIG. 3B illustrates a greatly enlarged portion of a disc drive showing the bias member of FIG. 3A, in a second position.

FIG. 3C illustrates a greatly enlarged portion of a disc drive showing the bias member of FIGS. 3A and 3B, in a third position.

FIG. 4 is a side view of a portion of a disc drive using bias members according to the present invention.

DETAILED DESCRIPTION OF THE PREFERRED EMBODIMENTS

FIG. 1A is a side view of a portion of a conventional disc drive 10. Disc drive 10 includes a plurality of magnetic discs 12 and 14 mounted for rotation about a spindle 16. An electromechanical actuator 18 has a plurality of actuator arms 20, 22 and 24. Electromechanical actuator 18 also includes a voice coil 26. A plurality of head gimbal assemblies 28, 30, 32 and 34 are coupled to actuator arms 20, 22 and 24.

Head gimbal assemblies 28, 30, 32 and 34 are all formed in substantially the same way. Therefore, only head gimbal assembly 28 will be described in detail. Head gimbal assembly 28 includes load beam 36, coupled to slider 38. Slider 38, in turn, supports a transducer 40. Load beam 36 is coupled to actuator arm 20 by baseplate 42. Load beam 36 is sandwiched between baseplate 42 and actuator arm 20. In one preferred embodiment, those elements are ball-swaged together to form a substantially rigid connection therebetween.

In operation, load beam 36 is resilient in a direction generally normal to the surface of disc 12 and is biased to exert a downward force on slider 38 toward the surface of disc 12. Slider 38 includes a hydrodynamic air bearing which, upon sufficient angular velocity of disc 12 about spindle 16, develops a hydrodynamic lifting force which lifts slider 38 off of the surface of disc 12. When the hydrodynamic lifting force reaches a sufficient magnitude, the slider 38 lifts off of the surface of disc 12 and flies above that surface carrying transducer 40 with it. In this way, transducer 40 flies above the surface of disc 40 sensing the magnetic flux reversals encoded on disc 40, or encoding magnetic flux reversals on disc 40.

The servo positioning system (not shown) interacts with voice coil 26 to rotate electromechanical actuator 18 relative to discs 12 and 14. This causes movement of head gimbal assemblies 28, 30, 32 and 34 in a radial direction relative to the surfaces of discs 12 and 14. Therefore, in performing a track following operation, the servo positioning system holds the head gimbal assemblies in a stationary radial position over desired tracks on the respective surfaces of discs 12 and 14. In performing a track seek operation, the servo positioning system moves the head gimbal assemblies in a radial direction to a desired track from which data is to be accessed, or to which data is to be written.

When disc drive 10 is subjected to a shock, such as when it is dropped or struck, a number of things can happen. First, if the shock is violent enough, actuator arms 20, 22 and 24 can deflect. Similarly, discs 12 and 14 can deflect. For instance, assuming that sufficient shock is imparted in disc drive 10, actuator arms 20 and 22 deflect in the direction generally indicated by arrows 42 and 44. In addition, the edges of discs 12 and 14 deflect in the direction generally indicated by arrows 46 and 48. With sufficient deflection, the baseplate 42 associated with head gimbal assembly 28, and the baseplate associated with head gimbal assembly 32 can actually come into contact with the respective surfaces of discs 12 and 14.

FIG. 1B illustrates this contact. Should the shock on disc drive 10 be sufficient, it causes contact between baseplate 42 and the surface of disc 12. Such contact can significantly damage the surface of disc 12. This can result in permanent damage to the disc surface, and almost certainly results in loss of any data stored on that portion of the disc surface.

Also, if a shock is imparted on disc drive 10 causing contact between baseplate 42 and the surface of disc 12, this contact can impart sufficient shock to the head gimbal assembly to cause head slap. Head slap occurs when a shock is imparted on the head gimbal assembly resulting in an upward force on at least one of the sliders, such as slider 40, generally in the direction indicated by arrow 50 shown in FIG. 1A. Under certain conditions, and specifically under non-operating conditions, there is no hydrodynamic lifting force acting on slider 40. Therefore, slider 40 is forced upwardly off of the surface of disc 12 under the force of the shock imparted on the head gimbal assembly, and the bias of load beam 36 subsequently brings slider 40 back down into violent contact with the surface of disc 12. If this contact is violent enough, it can result in permanent damage of the recording medium, and will almost certainly result in degradation of the head/disc interface.

FIG. 2 is a perspective view of a portion of a load beam 52 according to the present invention. Load beam 52 includes a first end 54 which is coupled between a baseplate and an actuator arm. Load beam 52 also includes a second end 56 which is typically coupled to a suspension or gimbal which is, in turn, coupled to a slider that carries a transducer. In one preferred embodiment, the gimbal is a separate element coupled to a portion of load beam 56. In a second preferred embodiment, the gimbal is an integrated suspension assembly coupled to load beam 52.

Load beam 52 also includes bias member 58 which is formed therein. Bias member 58 is preferably integrally formed with the remainder of load beam 52 and is simply stamped out with a die. Bias member 58 is also preferably formed as a cantilevered beam or spring disposed at an angle α relative to the major planar surface of end 54. The angle α causes bias member 58 to project outwardly from the rest of load beam 52. Bias member 58 extends upwardly having a first generally linear and planar portion 60, a curved portion 62 and terminates in end 64.

FIGS. 3A, 3B and 3C illustrate the operation of bias member 58 first under a no-shock condition and then under a severe shock condition in which a shock is imparted on the disc drive containing bias member 58. FIG. 3A illustrates load beam 52 according to the present invention sandwiched between a baseplate 66 and an actuator arm 68. Load beam 52 is also shown in FIG. 3A positioned relative to a disc 70. FIG. 3A illustrates the position of the various elements prior to, or at the inception of the shock. Bias member 58 extends toward disc 70 beyond baseplate 66 and is spaced a small distance from the surface of disc 70. This spacing is provided so that bias member 58 does not contact the surface of disc 70 if only small amplitude shocks are imparted on the drive. This spacing will vary with different applications, as well the distance by which bias member 58 extends beyond baseplate 66. In one preferred embodiment, bias member 58 extends approximately 0.004 inches beyond baseplate 66.

Under a shock condition in which a severe shock is imparted on the disc drive, disc 70 deflects in the direction indicated by arrow 72, while load beam 52, actuator arm 68 and baseplate 66 deflect in the direction indicated by arrow 74. FIG. 3B illustrates the disc drive during absorption of the shock imparted thereon. The curve portion 62 of bias member 58 initially contacts the surface of disc 70, assuming the shock is of sufficient magnitude. The bias provided by bias member 58 is sufficient to begin absorbing the shock imparted on the disc at that moment. In other words, due to the bias force exerted by bias member 58, bias member 58 begins to deflect, absorbing the contact energy between the disc surface and bias member 58.

FIG. 3C shows the system shown in FIGS. 3A and 3B, as disc 70 continues to deflect toward actuator arm 68. Bias member 58 continues to deflect, and continues to absorb greater amounts of the contact energy between the disc 70 and bias member 58 induced by the shock on the disc drive. The bias force exerted by bias member 58 essentially prevents contact between baseplate 66 of the surface of disc 70, under most shock conditions. This significantly reduces the failure rate of the disc drives under shock conditions.

In addition, since bias member 58 absorbs a great deal of the shock imparted on the disc drive, bias member 58 also significantly reduces the incidents and magnitude of head slap. This also significantly reduces the failure rate of the drive.

FIG. 4 illustrates a disc drive 80 according to the present invention. Disc drive 80 is substantially similar to disc drive 10 shown in FIG. 1A, except that bias members 58 are implemented in the drive. It should be noted that, while bias member 58 is shown as part of the load beam 52 in the preferred embodiment, it could also be assembled as part of the baseplates, or between the baseplates and the actuator arms as a separate member. However, since load beam 52 is formed of a resilient material and is formed by stamping a die, stamping bias member 58 into the load beam is a preferred embodiment.

Finite, element simulations have been performed simulating the present invention. These simulation results are tabulated in Table 1.

TABLE 1

| Shock | Disc Contact Force (lbs) | | |
| --- | --- | --- | --- |
| Amplitude (Gs) | Spring Absorber | Baseplate (with Absorber) | Baseplate (without Absorber) |
| 400 | 0 | 0 | 0 |
| 600 | 0.061 | 0 | 0 |

TABLE 1-continued

| Shock | Disc Contact Force (lbs) | | |
|---|---|---|---|
| Amplitude (Gs) | Spring Absorber | Baseplate (with Absorber) | Baseplate (without Absorber) |
| 800 | 0.084 | 0 | 0 |
| 1000 | 0.106 | 0 | 0.071 |
| 1200 | 0.122 | 0 | 0.315 |
| 1400 | 0.166 | 0.231 | 0.582 |

The simulation results in Table 1 show, in the left hand column, the shock amplitude imparted on the disc drive in units of gravity (i.e., 386.4 in/sec$^2$) for a 2 millisecond half-sine shock pulse. This measurement correlates to shock induced by, for example, dropping the disc drive.

On the right hand side of Table 1, the disc contact force, in pounds, is illustrated for spring bias member 58 (spring absorber), for a baseplate (such as baseplate 66) where no spring bias member 58 is used, and then for a baseplate where spring bias member 58 is used. Table 1 indicates that, where the shock imparted on the disc drive is only 400 Gs, neither the spring absorber nor the baseplate in either drive contacts the disc surface. However, as the shock amplitude increases above 600 Gs, the spring bias member 58 contacts the disc drive with a very small force. At 1000 Gs of imparted shock, spring bias member 58 contacts the disc surface with 0.106 pounds of force. It can be seen that, even without spring bias member 58, the baseplate would only contact the disc surface with 0.071 pounds of force.

However, the advantages of spring bias member 58 are dramatically illustrated when the amplitude of the shock imparted is 1200 Gs. In that instance, the spring bias member 58 contacts the disc with a force of 0.122 pounds, while the baseplate without spring bias member 58 contacts the disc with over 2½ times as much force (i.e., 0.315 pounds).

The benefit of spring bias member 58 is also shown where the shock amplitude is 1400 Gs. In that case, spring bias member 58 contacts the disc surface with 0.166 pounds of force, and the baseplate associated with spring bias member 58 contacts the disc surface with 0.231 pounds of force. However, without spring bias member 58, the baseplate contacts the disc with 0.582 pounds of force.

Bias member 58 is preferably sized so that it is compliant enough so that contact with the disc will not damage the disc surface, by gouging the disc surface. Of course, the widths and lengths of bias member 58 can be adjusted to achieve any desired bias force.

Although the present invention has been described with reference to preferred embodiments, workers skilled in the art will recognize that changes may be made in form and detail without departing from the spirit and scope of the invention.

What is claimed is:

1. A transducer support assembly supporting a transducer relative to a disc surface in a disc drive, the transducer support assembly comprising:

a slider coupled to the transducer for reading or writing information to the disc;

a gimbal coupled to the slider;

a load beam coupled to the gimbal;

an actuator arm coupled to the load beam; and a baseplate coupled to the load beam proximate a first end portion of the load beam, the first end portion having a generally planar surface portion;

the load beam includes a spring extending from the load beam toward the disc surface and including a contact surface spaced from the disc surface during operation and contacting the disc surface during shock, the contact surface being positioned closer to the disc surface than the baseplate to protect the baseplate from contact with the disc surface.

2. The transducer support assembly of claim 1 wherein the spring is sized to have sufficient compliance to avoid damage to the disc surface upon initial contact therewith.

3. The transducer support assembly of claim 1 wherein the spring comprises:

a cantilever arm coupled to the load beam.

4. The transducer support assembly of claim 3 wherein the cantilever arm is integrally formed with the load beam.

5. The transducer support assembly of claim 1 wherein the spring member includes an elongated flexible portion detached from the load beam and movable relative thereto, said elongated flexible portion defining a contact surface contacting a disc surface during shock for providing a contact interface with the disc surface.

6. A transducer support assembly supporting a transducer relative to a disc surface in a disc drive, the transducer support assembly comprising:

a slider coupled to the transducer for reading or writing information to the disc;

a gimbal coupled to the slider;

a load beam coupled to the gimbal;

an actuator arm coupled to the load beam; and a baseplate coupled to the load beam proximate a first end portion of the load beam, the first end portion having a generally planar surface portion;

the load beam includes a cantilevered arm coupled thereto extending beyond the baseplate in a direction generally away from the planar surface portion of the first end portion and generally toward the disc surface, the cantilever arm has a first generally straight portion extending away from the planar surface portion of the load beam and a curved disc contact portion extending from the first generally straight portion, the disc contact portion being spaced from the disc surface during operation and contacting the disc surface during shock.

7. A transducer support assembly supporting a transducer relative to a disc in a disc drive, the transducer support assembly comprising:

a slider coupled to the transducer for reading or writing information to the disc; and a suspension assembly including a load beam and a load beam support assembly, supporting the slider, the suspension assembly including a spring coupled to at least one of the load beam or load beam support assembly and spaced from the disc during operation and upon relative movement of the disc and the suspension assembly toward one another a sufficient distance during shock, the spring contacts the disc and exerts a force thereagainst before a remainder of the suspension assembly contacts the disc.

8. The transducer support assembly of claim 7 wherein the spring includes an elongated flexible portion detached from the load beam and load beam support assembly and movable relative thereto to define a contact surface contacting a disc surface for providing a contact interface with the disc surface.

9. The transducer support assembly of claim 8 wherein the load beam support assembly comprises;

an actuator arm coupled to a first side of the load beam; and a baseplate coupled to a second side of the load beam and the spring is coupled to the load beam or baseplate.

10. The transducer support assembly of claim 8 wherein the suspension assembly includes a gimbal coupled between the load beam and the slider.

11. The transducer support assembly of claim 8 wherein the spring is coupled to the load beam.

12. The transducer support assembly of claim 11 wherein the spring is formed integrally with the load beam.

13. The transducer support assembly of claim 11 wherein the load beam includes a generally planar surface and wherein the spring extends in a direction generally away from the generally planar surface toward the disc further than the remainder of the suspension assembly.

14. The transducer support of claim 13 wherein the spring is spaced from the disc under non-shock conditions and comes into contact with the disc, when a sufficient shock is imparted on the disc, to absorb a portion of the shock and reduce contact force between the disc and the remainder of the suspension assembly.

15. A transducer support assembly supporting a transducer relative to a disc in a disc drive, the transducer support assembly comprising:
    a slider coupled to the transducer for reading or writing information to the disc;
    a suspension assembly comprising;
        a load beam operably coupled to the slider; and
        a load beam support assembly coupled to the load beam;
    a bias member coupled to the load beam, said bias member comprising a cantilever beam extending from the load beam to a disc contact location spaced from the disc under non-shock conditions and said bias member coming into contact with the disc, when a sufficient shock is imparted, to absorb a portion of the shock and reduce contact force between the disc and the remainder of the suspension assembly.

16. The transducer support assembly of claim 15 wherein the cantilever beam comprises:
    a first generally straight portion extending from the load beam; and
    a curved portion, coupled to the first generally straight portion, at the disc contact location.

17. The transducer support assembly of claim 15 wherein the cantilever beam is formed with sufficient resilience to avoid damaging the disc upon initially coming into contact with the disc and upon being deflected to a point at which the baseplate contacts the disc.

18. A transducer support assembly for supporting a transducer relative to a disc in a disc drive, the transducer support assembly comprising:
    a slider coupled to the transducer for reading or writing information to the disc;
    a gimbal coupled to the slider;
    an actuator arm coupled to the load beam; and
    a baseplate coupled to the load beam proximate a first end portion of the load beam, the first end portion having a generally planar surface portion;
    the load beam includes a cantilevered spring formed integrally therewith and extending beyond the baseplate in a direction generally away from the planar surface portion of the first end portion and generally toward the disc, wherein the cantilevered spring is normally spaced from the disc during operation and contacts the disc during shock upon sufficient relative deflection of the disc and the actuator arm toward one another.

19. The transducer support assembly of claim 18 wherein the cantilevered spring is formed with sufficient resilience to avoid damaging the disc upon initially coming into contact with the disc and upon being deflected to a point at which the baseplate contacts the disc.

\* \* \* \* \*